US012657733B2

(12) United States Patent
Löfgren

(10) Patent No.: US 12,657,733 B2
(45) Date of Patent: Jun. 16, 2026

(54) METHODS AND DEVICES FOR OBJECT TRACKING APPLICATIONS

(71) Applicant: SAAB AB, Linköping (SE)

(72) Inventor: Torbjörn Löfgren, Uppsala (SE)

(73) Assignee: SAAB AB, Linköping (SE)

( * ) Notice: Subject to any disclaimer, the term of this patent is extended or adjusted under 35 U.S.C. 154(b) by 472 days.

(21) Appl. No.: 17/835,357

(22) Filed: Jun. 8, 2022

(65) Prior Publication Data

US 2022/0405942 A1     Dec. 22, 2022

(30) Foreign Application Priority Data

Jun. 9, 2021     (SE) .................................... 2100098-9

(51) Int. Cl.
*G06T 7/20* (2017.01)

(52) U.S. Cl.
CPC ...... *G06T 7/20* (2013.01); *G06T 2207/20076* (2013.01); *G06T 2207/20081* (2013.01); *G06T 2207/30248* (2013.01)

(58) Field of Classification Search
CPC ............. G06T 7/20; G06T 2207/20076; G06T 2207/20081; G06T 2207/30248; G06T 7/277; G06T 7/207; G01S 17/00; G06F 17/18; G06F 2218/00; G06N 20/00; B60R 1/20
See application file for complete search history.

(56) References Cited

U.S. PATENT DOCUMENTS

| | | | |
|---|---|---|---|
| 5,537,118 A | 7/1996 | Appriou | |
| 2007/0073473 A1 | 3/2007 | Altan et al. | |
| 2014/0266865 A1* | 9/2014 | Doyle ..................... | G01S 7/354 342/194 |
| 2017/0284817 A1* | 10/2017 | Greenspan ......... | G01C 21/3438 |

(Continued)

FOREIGN PATENT DOCUMENTS

| | | |
|---|---|---|
| GB | 2564146 A | 1/2019 |
| WO | 2012/166757 A2 | 12/2012 |

OTHER PUBLICATIONS

Pedersen, M. W., U. H. Thygesen, and H. Madsen. "Nonlinear tracking in a diffusion process with a Bayesian filter and the finite element method." Computational Statistics and Data Analysis 55 (2011): 280-290. (Year: 2011).*

(Continued)

*Primary Examiner* — Sean M Conner
(74) *Attorney, Agent, or Firm* — Sage Patent Group

(57) ABSTRACT

The present disclosure relates to a computer-implemented method for object tracking applications, preferably in Bayesian object tracking applications. The method includes the steps of providing a finite element model representing a sensor model of at least one sensor. Further, the method trains said finite element model based on observations, wherein each observation includes an output of the at least one sensor paired with a known state of at least one training object, at the time of the output of the at least one sensor, in an environment sensed by the at least one sensor. Further, the method includes the steps of obtaining signals associated with at least one tracked object in an environment sensed by the at least one sensor. Furthermore, the method determines additional outputs of the at least one sensor based on the obtained signals.

11 Claims, 11 Drawing Sheets

(56) References Cited

U.S. PATENT DOCUMENTS

| | | |
|---|---|---|
| 2020/0033870 A1 | 1/2020 | Derenick |
| 2020/0132812 A1* | 4/2020 | Dvorecki .............. G01S 13/931 |
| 2020/0226426 A1 | 7/2020 | Jarquin Arroyo et al. |
| 2021/0117787 A1 | 4/2021 | Stal et al. |
| 2022/0004808 A1* | 1/2022 | Yuan ....................... G06T 7/136 |

OTHER PUBLICATIONS

Malassiotis, Sotiris, and Michael G. Strintzis. "Tracking textured deformable objects using a finite-element mesh." IEEE transactions on circuits and systems for video technology 8.6 (2002): 756-774. (Year: 2002).*

Aughenbaugh, J. M. et al.; "A Polynomial-Adaptive Scheme for Bayesian Tracking"; 14th International Conference on Information Fusion; Jul. 5-8, 2011; Chicago, IL; pp. 1115-1122, 8 pages.

De, A. et al.; "Convergence of Bayesian Histogram Filters for Location Estimation"; 52nd IEEE Conference on Decision and Control, Dec. 2013, pp. 7047-7053, 3 pages (Abstract only).

Wuhrer, S. et al.; "Finite Element Based Tracking of Deforming Surfaces"; Graphical Models vol. 77; 2015; pp. 1-17; 19 pages.

Office Action mailed Feb. 11, 2022 for Swedish Patent Application No. 2100098-9, 10 pages.

Williams, O. et al.; "Sparse Bayesian Learning for Efficient Visual Tracking"; IEEE Transactions on Pattern Analysis and Machine Intelligence, vol. 27, No. 8, Aug. 2005, 13 pages.

Extended European Search Report mailed Dec. 16, 2022 for European Patent Application No. 22177280.9, 11 pages.

Mccalman, Lachlan et al.; "Multi-Modal Estimation with Kernel Embeddings for Learning Motion Models"; 2013 IEEE International Conference on Robotics and Automation (ICRA); Karlsruhe, Germany; May 6-10, 2013; pp. 2845-2852 (8 pages).

Scheel, Alexander et al.; "Tracking Multiple Vehicles Using a Variational Radar Mode"; IEEE Transactions on Intelligent Transportation Systems, vol. 20, No. 10; Oct. 2019; pp. 3721-3736 (16 pages).

* cited by examiner

10'

METHODS AND DEVICES FOR OBJECT TRACKING APPLICATIONS

CROSS-REFERENCE TO RELATED APPLICATIONS

The present application for patent claims priority to Sweden Patent Office Application Ser. No. 2100098-9, entitled "METHODS AND DEVICES FOR OBJECT TRACKING APPLICATIONS" filed on Jun. 9, 2021, assigned to the assignee hereof, and expressly incorporated herein by reference.

TECHNICAL FIELD

The present invention relates to a method and devices for object tracking applications.

BACKGROUND

In recent years, there is a rapidly growing importance in surveillance, which has made it a necessary area of research. Specifically object tracking is an important topic which is of high importance. There exist several techniques for tracking objects of interest and object tracking has numerous applications such as in traffic control, human computer interaction, forensics, augmented reality and visual surveillance.

In Bayesian tracking applications, is it important to describe the probability distribution for different kind of evidences supporting the tracking scheme. For a sensor, this is the probability i.e. the probability to get the observed sensor output, given an assumed hypothesis in the tracking scheme.

For example a probability to be modelled may be the probability for a sensor to get an observed angle of arrival in the sensor given an assumed true direction of arrival. This probability is often modelled using an "error model" in the sensor. However, such an error model, and other existing sensor models are not compatible with the properties of the sensor. Conventionally, the modelling choice is just motivated by simplicity, not by the nature of the sensor. Large fundamental errors are thus normally incorporated in the tracking models by the use of in-adequate sensor models. Accordingly, sensor models usually do not perform sufficiently in object tracking applications.

Thus, there is room in the present art to explore the domain of providing a method for object tracking applications and a sensor device that offers minimized sensor error and improves the tracking of objects compared to previous solutions. There is specifically a need in the present art for improving sensor models used in object tracking applications so to be able to provide an improved system performance with minimal error and. Accordingly, there is room for improvements in the art to provide means for methods and devices utilizing such sensor models.

Even though some currently known solutions work well in some situations it would be desirable to provide a method and devices that fulfils requirements related to improving the system performance of the same in object tracking applications, more specifically to improve system performance and reduce error in Bayesian object tracking applications.

SUMMARY

It is therefore an object of the present disclosure to provide methods for object tracking applications, and sensor devices to mitigate, alleviate or eliminate one or more of the above-identified deficiencies and disadvantages.

This object is achieved by means of methods, a vehicle, and a sensor device as defined in the appended claims 1 and 8-11.

The present disclosure is at least partly based on the insight that by providing improved methods for object tracking applications, and a sensor devices for object tracking applications, the tracking of objects, when utilizing the methods and the sensor devices will be improved both in terms of having a better system performance, a smaller error and a more rapid tracking.

The present disclosure provides a computer-implemented method for object tracking applications, preferably in Bayesian object tracking applications. The phrase "object tracking applications" may within the scope of the disclosure be interchanged with "object tracking" solely. The method comprises the steps of, providing a finite element model representing a sensor model of at least one sensor. Further, the method trains said finite element model (FEM) based on observations, wherein each observation comprises an output of the at least one sensor paired with a known state of at least one training object, at the time of the output of the at least one sensor, in an environment sensed by the at least one sensor.

Further, the method comprises the steps of, obtaining signals associated with at least one tracked object in an environment sensed by the at least one sensor. Furthermore, the method determines additional outputs of the at least one sensor based on the obtained signals. Moreover the method comprises the step of determining, based on the trained finite element model, a probability density for each additional output of the at least one sensor conditional on states of the at least one tracked object at the time of each of the additional outputs of the at least one sensor, in the environment sensed by the at least one sensor.

A benefit of the method is that it allows for, by the application of FEM, representing a probability distribution that is not limited to regular elements, instead the combined space of outputs and states is expressed in the sensor model providing an accurate and detailed distribution. The usage of FEM enables free assignment of element density and the very knowledge of a distribution everywhere as basis function of desired regularity are assigned to the mesh. The free assignment of the element density is especially beneficial when the sensor model is trained using data at hand. The choice of element density is a trade-off between at least two types of estimation errors. Too densely packed elements means lack of statistical support in the available training data, resulting in large errors in the sensor model. Contrary, if the elements are spread out, the sensor model loses resolution. The flexibility in FEM meshes as obtained by the present disclosure makes it possible to balance the two error terms depending on local availability of training data in different domains. The sensor model according to the present disclosure thus provide high fidelity in areas with plenty of training data and lower fidelity in areas with reduced availability of training data. Balancing of the error terms in an optimized way is enabled by the flexible and local mesh-assignment in FEM. In many applications the availability of training data cannot be controlled. Data that becomes available can herein, by the flexible mesh assignment in FEM be used optimally also when the data selection is not a result of a planned measurement campaign.

The very usage of a true sensor model further optimizes different error terms in an object tracking scheme. Areas in the sensor model with small error spread provides higher degree of information to the tracking scheme than areas with larger spread. The sensor model does, by training, learn to further fully separate bias components from noise components. The bias is completely compensated in the tracking scheme and the remaining spread is normally smaller.

Further, relating a state to the output of the sensor allows for estimating a state space that is greater than an output space observed by the sensor. A typical sensor calibration normally relates the provided output to the applied true value. The sensor models of the present disclosure separate two variables. The two variables may be of different types e.g. a "directional" sensor that can measure a single angle as azimuth may e.g. be related to a state being the true arrival direction (state). Note further that a bias that may be a function of true arrival direction never ever can be compensated for in a classical error model relating true angle to measured angle. By necessity, classical error models thus provide sub-optimal bias compensation will also by necessity overestimate the sensor spread as part of the spread is in fact a bias that cannot be modelled unless the output is related to the full space of arrival directions. Full bias compensation and thus smaller errors in the sensor model will improve the tracking performance improving point estimates as well as providing more accurate spread estimates.

The states may be at least one of known states and hypothetical states. Accordingly, the states of an object may be known states or hypothetical states. The probability density for the sensor output may be defined on a hypothetical state of the object which may be based on previous training of the sensor model. Thus, providing the benefit of allowing the sensor device to utilize previously trained data in upcoming object tracking.

The probability density for each output may be determined given all possible states. Thus, the sensor model may determine a probability density for each output for all possible states of an object. Accordingly, when the sensor device determines the probability density for an output, it may be determined given all possible states of an object associated with said output, allowing the sensor device to accurately and rapidly facilitate the tracking of an object. Thus, the method may allow for obtaining a probability density of each output conditional on all possible states which may be initiated by e.g. a scalar output obtained by the sensor.

The method may further comprise the step of representing the probability density in said finite element model of said sensor model for all possible outputs and all possible states. A benefit of this is that the sensor is modelled so that knowledge of the sensor device (e.g. error behaviour) will be fully acknowledged by means of the sensor model. Consequently, this allows for calibration of the sensor device resulting in smaller error and further, manufacturing errors may be compensated.

The method may further comprise the step of transmitting the probability density to a remote entity. Allowing the remote entity to, based on the probability density, determining e.g. object state.

The states may be at least one of direction to an object relative the sensor device, position of an object, velocity of an object, or the position and velocity of an object. Thus, the sensor device which may, based on provided output, provide estimates of the probability distribution covering all possible states. This is enabled even if the sensor itself is not providing outputs expressing the states of the tracked object.

The sensor model may be stored in a cloud server accessible and trained by a plurality of independent sensor devices. Thus, trained sensor models may be accessed by a plurality of sensor device, allowing e.g. a network of sensor devices to utilize the trained sensor model in order to reduce error margins and perform a more rapid operation. Accordingly, the sensor model may be trained by a plurality of sensor devices simultaneously. This is especially beneficial if individual variations are small. All inputs can then be used to train all individuals, resulting in a faster learning process and thus faster response.

There is further disclosed a sensor device for object tracking applications comprising control circuitry, a memory device, an input interface, at least one output interface, wherein the control circuitry is configured to execute instruction sets stored in the memory device to: provide a finite element model representing a sensor model of the sensor device. Further, train said finite element model based on observations, wherein each observation comprises an output of the at least one sensor paired with a known state of at least one training object, at the time of the output of the at least one sensor, in an environment sensed by the at least one sensor. Further, obtain signals associated with at least one tracked object in an environment sensed by the at least one sensor. Furthermore, determine additional outputs of the at least one sensor based on the obtained signals; and determine based on the trained finite element model, a probability density for each additional output of the at least one sensor conditional on states of the at least one tracked object at the time of each of the additional outputs of the at least one sensor, in the environment sensed by the at least one sensor.

The sensor device may provide any benefit as disclosed herein. Further, the sensor device can train the finite element model and further utilize a trained model in object tracking applications.

There is further disclosed a sensor device for object tracking applications comprising control circuitry, a memory device, an input interface, at least one output interface, wherein the control circuitry is configured to execute instruction sets stored in the memory device to provide/obtain a trained finite element model representing a sensor model of the sensor device, wherein said finite element model is trained based on observations, wherein each observation comprises an output of the at least one sensor paired with a known state of at least one training object, at the time of the output of the at least one sensor, in an environment sensed by the at least one sensor. Further, obtaining signals associated with at least one tracked object in an environment sensed by the at least one sensor. Further, determining additional outputs of the at least one sensor based on the obtained signals; and determining based on the trained finite element model, a probability density for each additional output of the at least one sensor conditional on states of the at least one tracked object at the time of each of the additional outputs of the at least one sensor, in the environment sensed by the at least one sensor.

Accordingly, the sensor device may provide/obtain a trained finite element model and utilize an already trained model in object tracking applications. Thus, the sensor device may by utilizing said trained model obtain benefits as disclosed herein.

There is further disclosed a vehicle comprising any sensor device as disclosed herein. The vehicle may be a ground-vehicle, an airborne vehicle, a ship or a space-vehicle. An airborne vehicle may be a UAV, helicopter or an airplane.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided method, devices and vehicles, it will be apparent to one skilled in the art that the method, devices and vehicles may be realized without these details. In other instances, well known constructions or functions are not described in detail, so as not to obscure the present disclosure.

Figure 1:
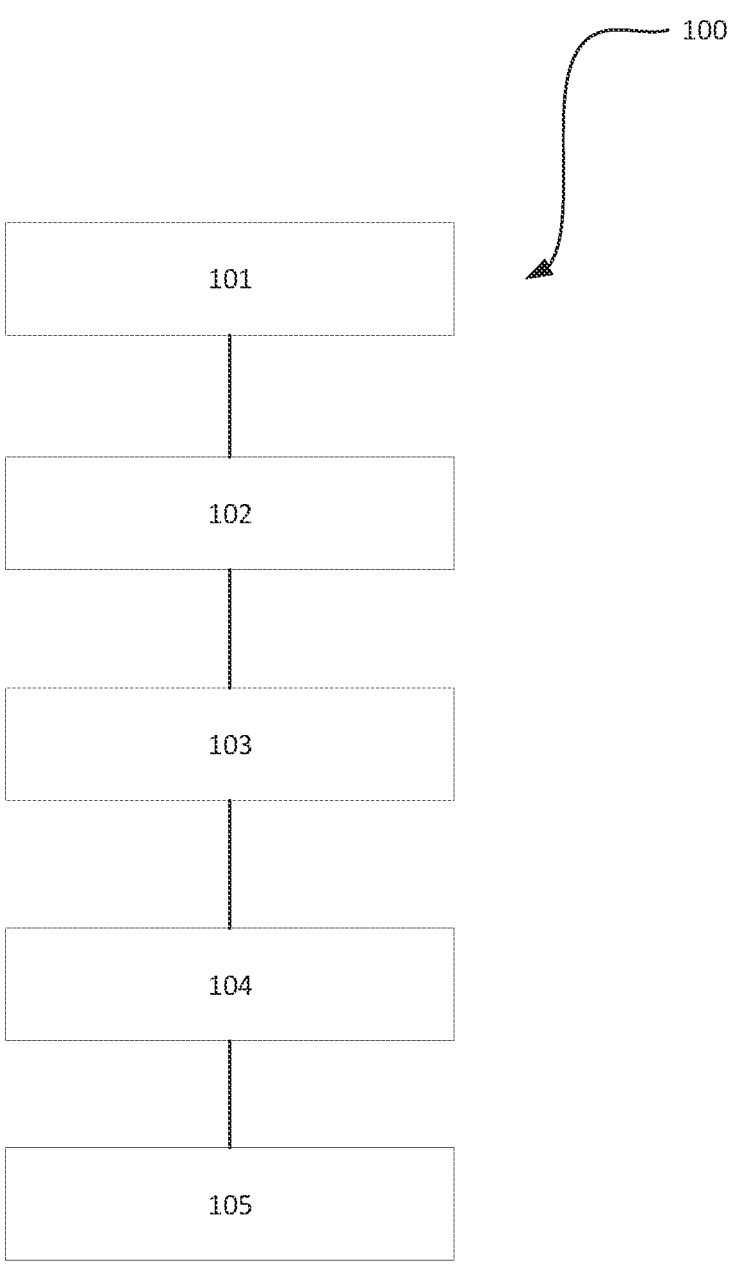
FIG. 1 illustrates a method for object tracking applications in accordance with an embodiment of the present disclosure.

FIG. 1 illustrates a flowchart of a computer-implemented method 100 for object tracking applications (or object tracking as such), preferably in Bayesian object tracking applications. The method 100 comprises the steps of, providing 101 a finite element model representing a sensor model of at least one sensor. Further, the method trains 102 said finite element model (FEM) based on observations, wherein each observation comprises an output of the at least one sensor paired with a known state of at least one training object, at the time of the output of the at least one sensor, in an environment sensed by the at least one sensor.

Further, the method 100 comprises the steps of, obtaining 103 signals associated with at least one tracked object in an environment sensed by the at least one sensor. Furthermore, the method 100 determines 104 additional outputs of the at least one sensor based on the obtained signals. Moreover the method 100 comprises the step of determining 105, based on (and/or by means of) the trained finite element model, a probability density for each additional output of the at least one sensor conditional on states of the at least one tracked object at the time of each of the additional outputs of the at least one sensor, in the environment sensed by the at least one sensor.

The steps 100-105 in the method 100 may be performed in any suitable order and are not limited to the order shown in FIG. 1.

The term "sensor model" may refer to a calculation model that describes the relations between sensor output of a sensor device and states of objects sensed by the sensor device.

The term "finite element model (FEM)" may refer to a numerical model representing a space subdivided into elements where basis functions are associated to each element or each node in the net/mesh. The assignment of basis-functions enables a defined function for all possible combinations of outputs and states, not only at the specific discrete combinations expressed by the nodes. Knowledge of the distribution in all points is central for statistical inference, i.e. transfer of densities to integrated statements related to probability.

The term "probability density" or "probability density function" in the present disclosure refers to a probability distribution function, the probability of an outcome per unit measure within a domain around a value (e.g. a sensor output). In the present disclosure the probability density may be conditional on states. The probability density may for the sensor model be a probability $P(S|H)$ i.e. the probability density to get a sensor output S observed by the sensor, given an assumed hypothesis H i.e. a state in the tracking scheme.

The states may be at least one of known (or true states) T and hypothetical states H. In the training step 102, the sensor model may be trained by known states T. Thus, for example a known object may be at a certain direction (or any state) relative the sensor device using the model, wherein the sensor is trained by obtaining sensor outputs, wherein each output may be paired with a known direction of the object, an example is shown in Table 1 below:

| Sensor output (angle) | State (direction) |
|---|---|
| Angle 1 | Known direction 1 |
| Angle 2 | Known direction 2 |
| Angle 3 | Known direction 3 |
| Angle n | Known direction n |

Table 1 in an exemplary manner illustrates each sensor output being paired with a known direction in training.

Based on the measured data, the finite element model may be populated with data which may be utilized in an object tracking application wherein the state of the object may be a hypothetical state which is determined based on the trained model. Formally the training estimates the coefficients for the basis-functions, defined on the net/mesh, providing a well-defined function defined for all possible combinations of output and states. Accordingly, each pair of output and known state may be stored in the sensor and forms a basis for update of the sensor model. The model may be trained incrementally or batch-vise by stored training data. A training session results in updated basis function coefficients and possibly also a modified mesh. The updated (refined) sensor model can then be used in the determination of probability densities for additional outputs obtained. A sensor output may as shown in Table 1 be e.g. an angle or any other measurement.

Thus in step 105, a probability density may be modelled for each additional output of the at least one sensor conditional on (known or hypothetical) states of the at least one tracked object. Accordingly, providing a probability density which, by FEM will model and accurately define the probability of an output conditional on states.

The probability density for each output may be determined given all possible states.

Figure 2:
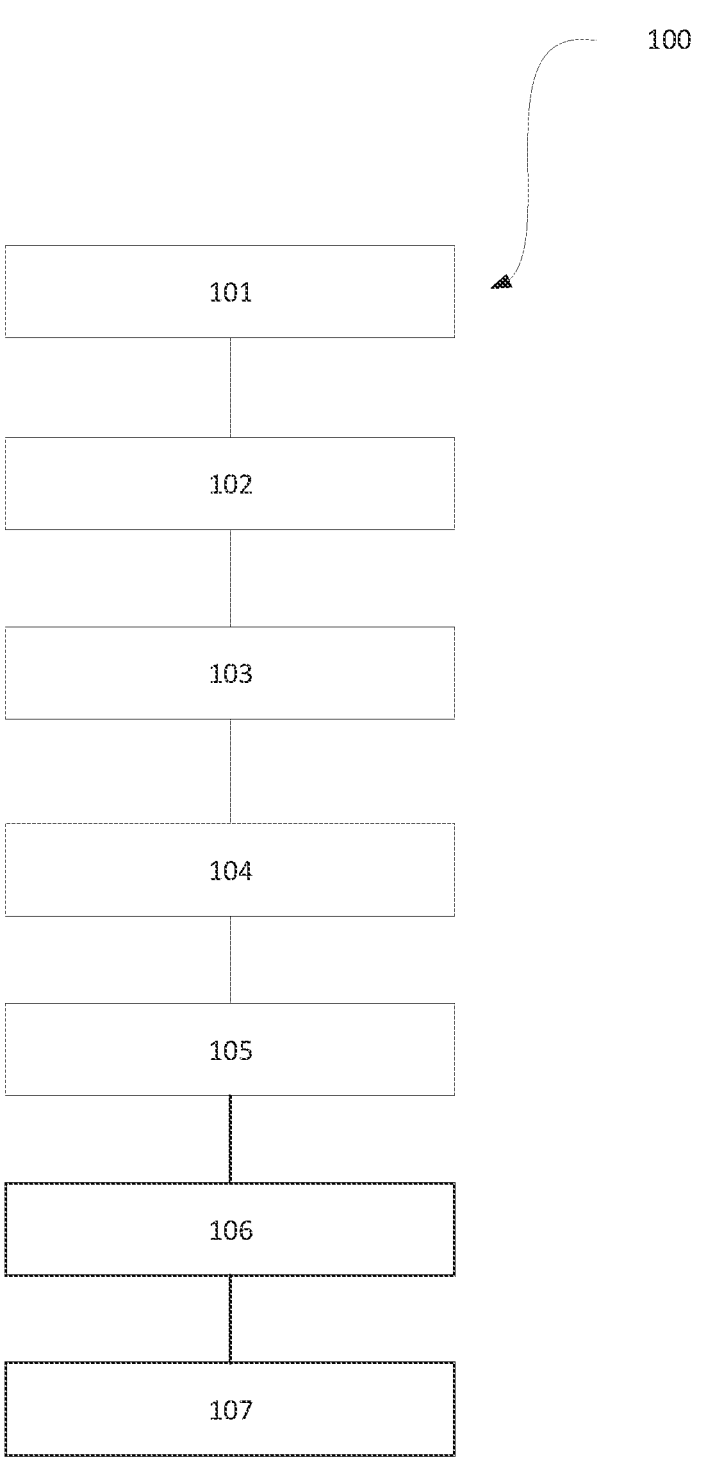
FIG. 2 illustrates a method for object tracking applications in accordance with an embodiment of the present disclosure.

FIG. 2 illustrates a flowchart of the method 100, wherein the method 100 further comprises the step of: representing 106 the probability density in said finite element model of said sensor model for all possible outputs and all possible states.

FIG. 2 further illustrates the method, further comprising the step of transmitting 107 the probability density to a remote entity, the remote entity may be a cloud server.

The states may be at least one of direction to an object relative the sensor device, position of an object, velocity of an object, or the position and velocity of an object.

The sensor model may be stored in a cloud server accessible and trained by a plurality of independent sensor devices.

Figure 3:
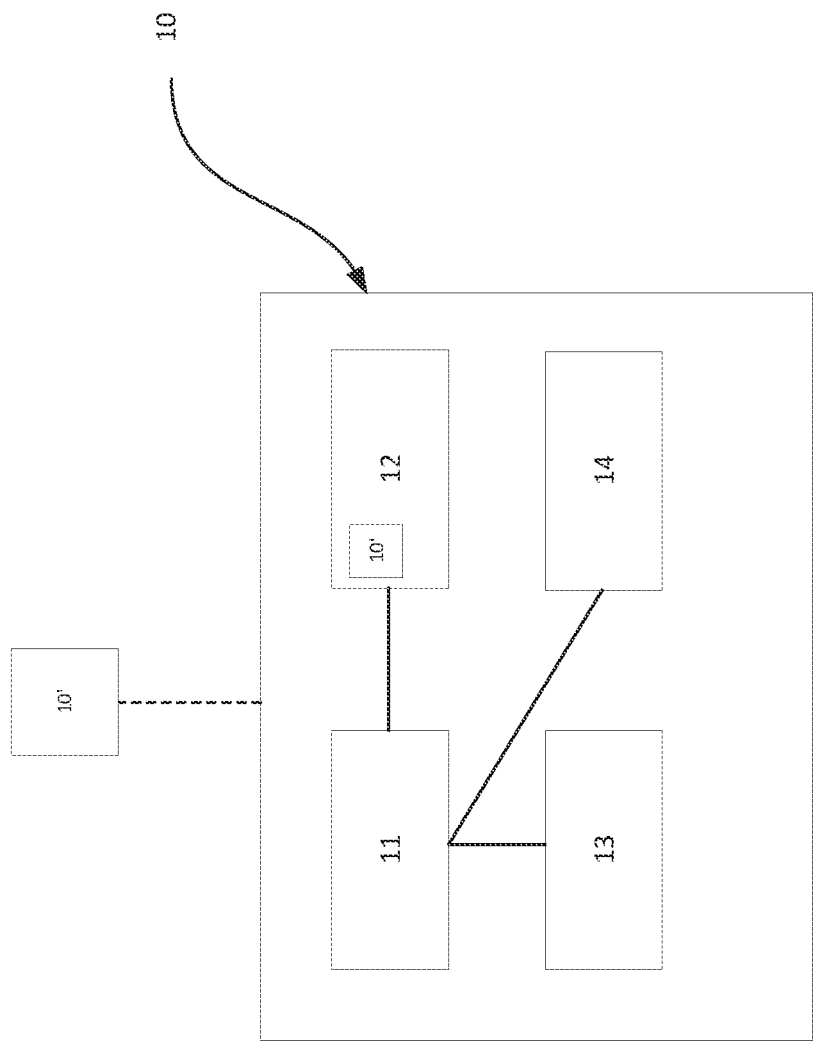
FIG. 3 illustrates a sensor device for object tracking applications in accordance with an embodiment of the present disclosure.

FIG. 3 schematically illustrates a sensor device 10 for object tracking applications or object tracking as such in accordance with the present disclosure, comprising control circuitry 11, a memory device 12, an input interface 13, at least one output interface 14, wherein the control circuitry 11 is configured to execute instruction sets stored in the memory device 12 to: provide a finite element model representing a sensor model 10' of the sensor device 10. Further configured to train said finite element model based on observations, wherein each observation comprises an output of the at least one sensor 10 paired with a known state of at least one training object, at the time of the output of the at least one sensor 10, in an environment sensed by the at least one sensor 10. Further, the control circuitry 11 is configured to obtain signals associated with at least one tracked object in an environment sensed by the at least one sensor 10 and to determine additional outputs of the at least one sensor 10 based on the obtained signals and further, determine based on the trained finite element model, a probability density (see FIG. 5) for each additional output of the at least one sensor 10 conditional on states of the at least one tracked object at the time of each of the additional outputs of the at least one sensor 10, in the environment sensed by the at least one sensor 10.

The sensor device 10 in FIG. 3 may in some embodiments, provide/obtain a trained finite element model representing a sensor model 10' of the sensor device, wherein said finite element model is trained based on observations. It may obtain a trained finite element model over a communication network.

The sensor device 10 may be a passive sensor device 10, wherein the passive sensor device 10 may obtain sensor data in the form of electromagnetic radiation.

As illustrated in FIG. 3, the sensor device 10 may comprise one or more memory devices 12 and control circuitry 11. The memory device 12 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by each associated control circuitry 11. Each memory device 12 may store any suitable instructions, data or information, including a computer program, software, an application including one or more of logic, rules, code, tables, etc. and/or other instructions capable of being executed by the control circuitry 11 and, utilized. Memory device 12 may be used to store any calculations made by control circuitry 12 and/or any data received via interface 13, 14. In some embodiments, each control circuitry 11 and each memory device 12 may be considered to be integrated.

Each memory device 12 may also store data that can be retrieved, manipulated, created, or stored by the control circuitry 11. The data may include, for instance, local updates, parameters, training data (e.g. data from step 102 in the method 100, learning models and other data. Thus, the sensor model 10' may be considered as such data and as shown in FIG. 3, the sensor model 10' may be stored in the memory device 12. However, the sensor model 10' may be stored in a cloud computing device accessible by the sensor device 10 (as shown by the dotted line in FIG. 3). The data can be stored in one or more databases. The one or more databases can be connected to the sensor device 10 by a high bandwidth field area network (FAN) or wide area network (WAN), or can also be connected to sensor device 10 through a communication network.

The control circuitry 11 may include, for example, one or more central processing units (CPUs), graphics processing units (GPUs) dedicated to performing calculations, and/or other processing devices. The memory device 12 can include one or more computer-readable media and can store information accessible by the control circuitry 11, including instructions/programs that can be executed by the control circuitry 12.

The instructions which may be executed by the control circuitry 11 may comprise instructions for implementing sensor models 10' according to any aspects of the present disclosure. For example, performing training so to update the sensor model 10' based on any training data or, to determine, based on the trained finite element model, a probability density for each additional output of the at least one sensor conditional on states. The control circuitry 11 may be configured to perform any of the steps as disclosed in the present disclosure such as the steps in the method 100.

The sensor device 10 may be configured to exchange data with one or more other sensor devices, or a remote entity or a cloud computing device over a network (not shown). Any number of sensor devices 10 may communicate over a network.

The network may be any type of communication network, such as a local area network (e.g. intranet), wide area network (e.g. Internet), cellular network, or some combination thereof. Communication between the sensor devices, clouds and remote entities can be carried via network interface using any type of wired and/or wireless connection, using a variety of communication protocols (e.g. TCP/IP, HTTP, SMTP, FTP), encodings or formats (e.g. HTMF, XMF), and/or protection schemes (e.g. VPN, secure HTTP, SSF).

Figure 4:
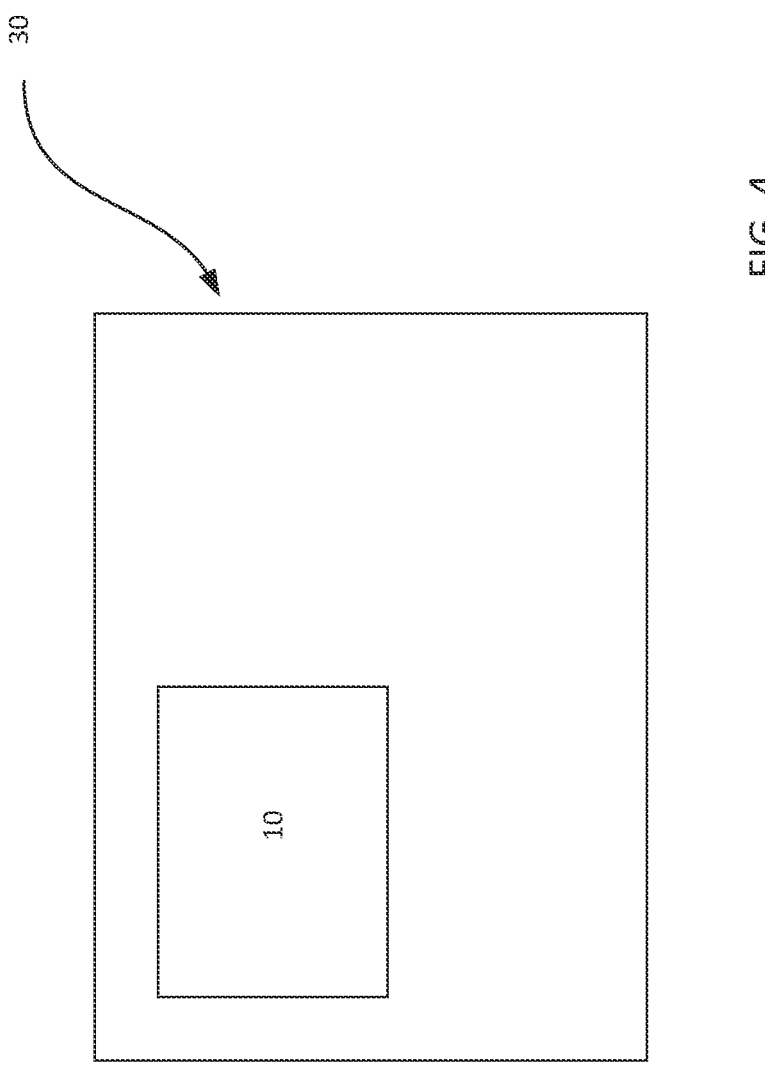
FIG. 4 illustrates a vehicle comprising a sensor device for object tracking applications in accordance with an embodiment of the present disclosure.

FIG. 4 illustrates a vehicle 30 comprising a sensor device 10. The vehicle 30 may be a ground-vehicle, an airborne vehicle or a ship. Thus, the sensor device 10 may be implemented in a vehicle for an object tracking application. It should however be noted that the sensor device 10 may also be implemented in fixed installations e.g. a base station.

Figure 5:
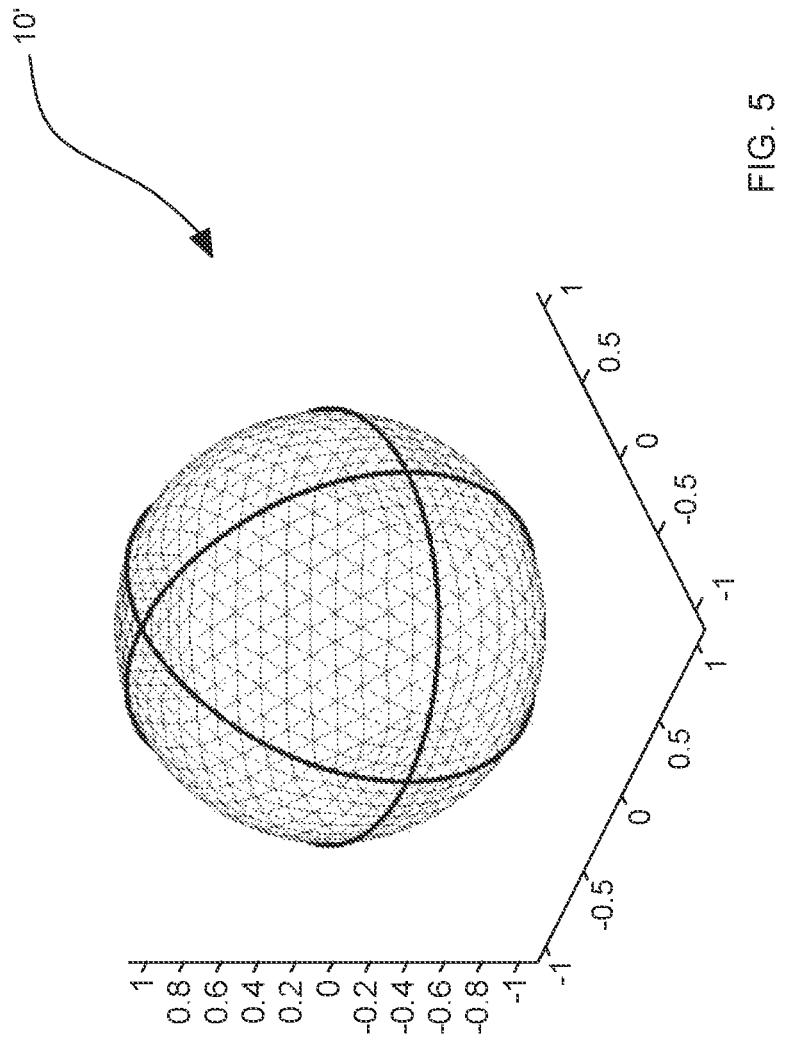
FIG. 5 illustrates a finite element model representing a sensor model in accordance with an embodiment of the present disclosure.

FIG. 5 illustrates the finite element model of the sensor model 10' in accordance with the present disclosure defining a combined space of sensor output and states. Thus, the disclosure herein may model a mesh distribution to any desired accuracy—providing a multidimensional model. Accordingly, for each output of the sensor device the model 10' may generate in said mesh shown in FIG. 5, a probability density of said output conditional on states of the at least one tracked object.

The probability density for a sensor output may be represented in said sensor model 10' and may e.g. express a directional dependence for a truly 2D sensor system, presented in the model 10'. Thus, for additional sensor outputs each being paired with a state (e.g. direction of arrival), this probability density may be generated for any new of said additional sensor outputs. FIG. 5 illustrates how a 2D sensor delivering a single angle can be handled with full 3D support by connecting it to directional states of e.g. an object in an environment sensed by the sensor device.

In an object tracking application, the sensor model 10' may be used and produce better object resolution in tracking by providing the sensor model 10' according to the present disclosure, wherein the sensor model 10' can be trained/or is trained to remove deficiencies from the sensor device i.e. resulting in accurate and known error estimations for the sensor when in a tracking application. Thus, the sensor device may successfully compensate for the systematic biasing parts of the errors in the sensor outputs based on the trained sensor model.

For further describing the disclosure as presented herein accompanied with further advantages thereof, a simulation of the system 1 in accordance with an embodiment as disclosed in FIGS. 1-5 will be described herein. The simulation is presented in the FIGS. 6-10. It should be noted that the test is based on an embodiment for a disclosing purpose, however it is not limited to said embodiment and may be varied within the present disclosure. E.g. the state, type of data, sensor model, sensor device and any other configuration may be varied in accordance with the present disclosure.

Figure 6:
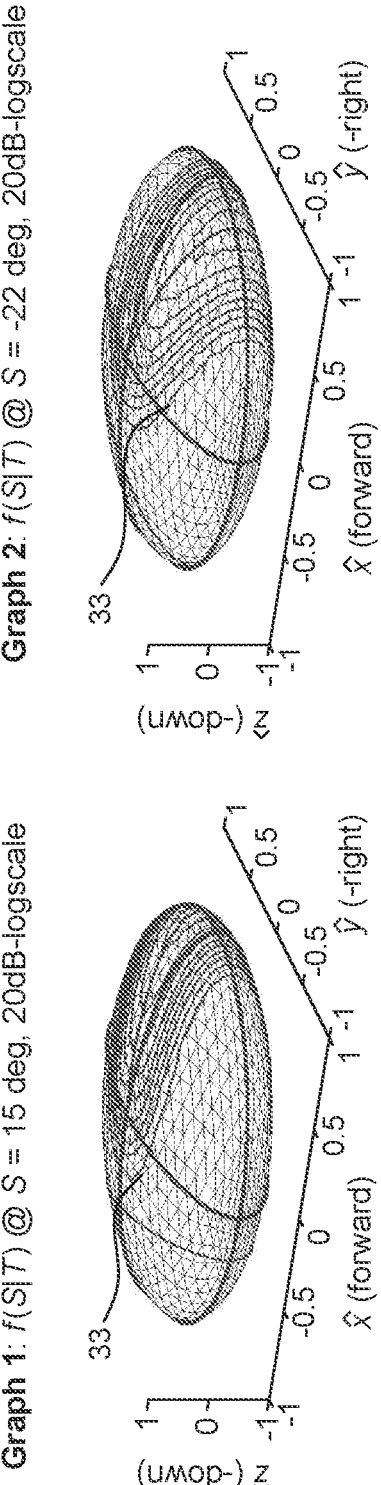
FIG. 6 illustrates an example of a finite element sensor model, wherein directional dependence is printed for given examples of sensor outputs.
Figure 6:
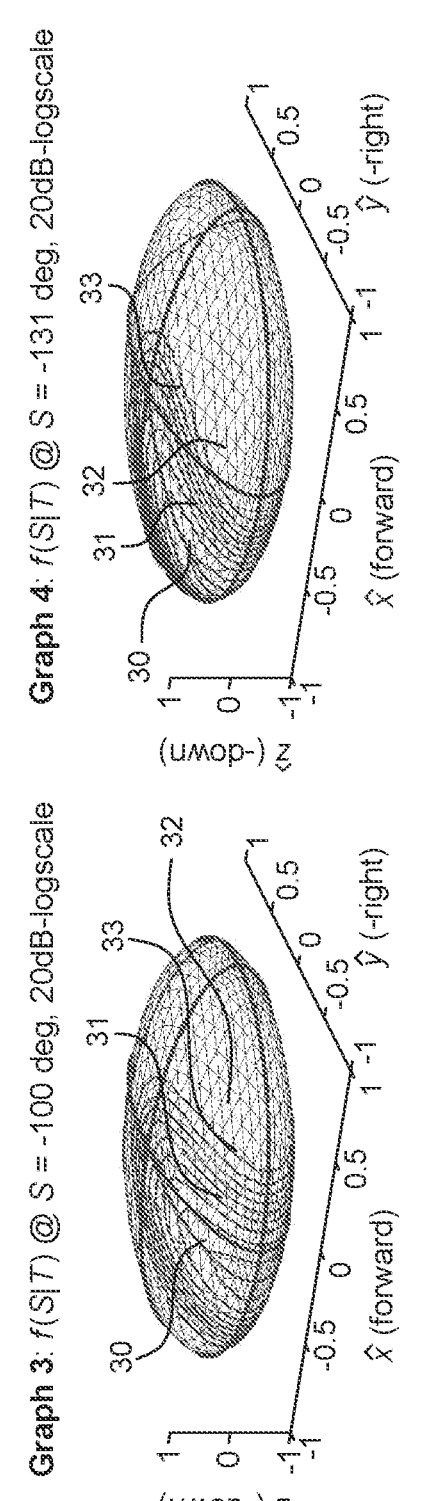

FIG. 6 illustrates the sensor model 10' of the present disclosure in (shown in four graphs Graph 1-Graph 4) wherein an exemplary view is shown, wherein direction of arrivals are shown as a function of different sensor outputs i.e. the compatibility between additional sensor outputs conditional on states of the at least one tracked object at the time of each of the additional outputs. The different axes of the graph (also for the graphs in FIG. 7) may be locked in a body of the sensor device or the body of e.g. a tracking vehicle. The probability density is indicated by contour lines 33 (seen traversing the grid in FIG. 6) representing different constant levels of the density in the FEM model, wherein an exemplary portion of the probability density is in FIG. 6 marked by directional coordinates 30, 31, 32 in the grid (seen in Graphs 3 and 4). The directional coordinates 30, 31, 32 being situated in regions with different probability densities. Thus the directional coordinates 30, 31, 32 in the graphs indicates three different probability regions. E.g. the directional coordinate 30 is situated at a high probability density region, directional coordinate 31 is situated in a transit region with densely packed contour lines and the directional coordinate 32 is situated in a region with a low probability density compared to the directional coordinates 30, 31. The representation of the probability density is not limited to the form shown in FIG. 6.

FIG. 6 shows a sample view for four discrete examples of sensor output where the FEM model stores the distribution for a continuous set of possible sensor outputs, not limited to the examples. The FEM model further requires higher number of nodes to resolve. An example system with an angular resolution on the level of a few degrees may have 200 000 nodes or more. f(SIT) refers to the probability distribution of a sensor output conditional on a state, wherein this is expressed in the finite element model. Thus, each output is paired with a state. FIG. 6 illustrates the dependency of direction, i.e. it illustrates the probability to get the output of the sensor that in fact was measured as function of the hypothetical arrival directions.

Figure 7:
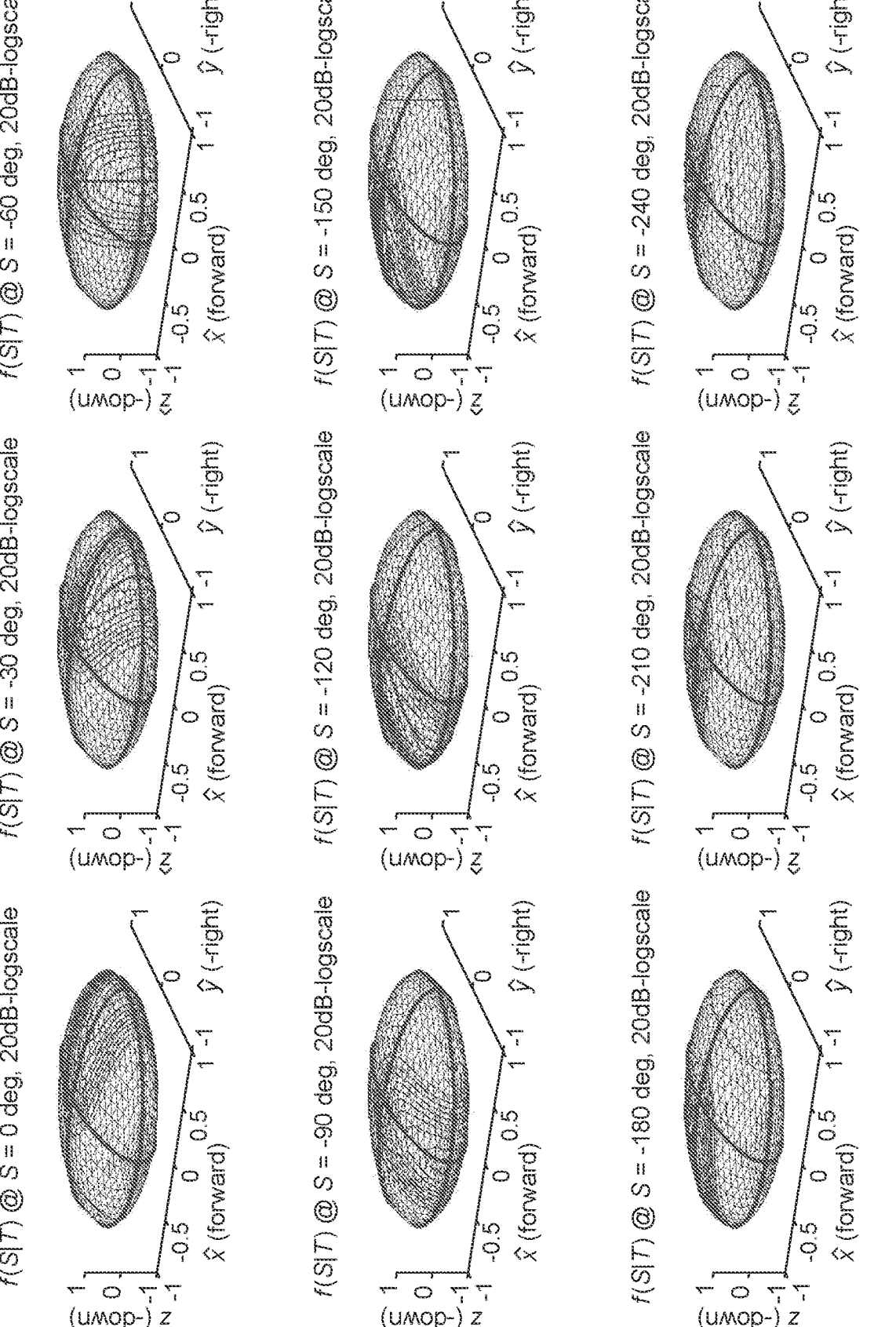
FIG. 7 illustrates an example of a finite element sensor model, wherein directional dependence is printed for given examples of sensor outputs; using the same data as FIG. 6, wherein the rotation of the probability pattern when changing sensor output is emphasized with nine plots.

FIG. 7 shows the sensor model 10' as in FIG. 6 for a plurality of sensor outputs (nine sensor outputs) paired with states.

Figure 8:
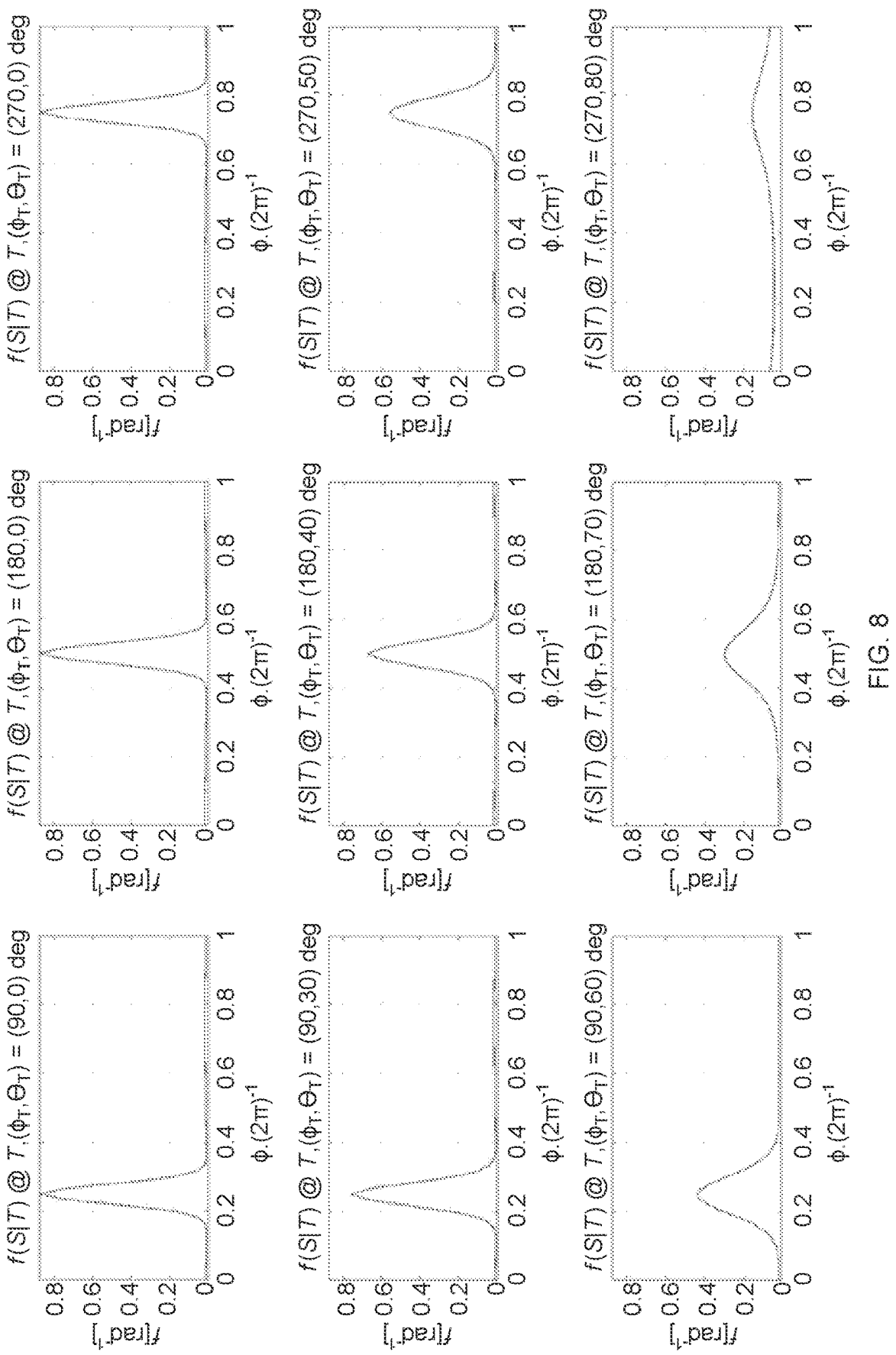
FIG. 8 illustrates an example of a finite element sensor model, wherein the distribution of sensor outputs is printed for given examples of true arrival directions indicated in the heading; the figure describes the same sensor model as in FIG. 6 and FIG. 7. The x-axis illustrates the angle or sensor output and the y-axis shows the probability density.

FIG. 8 illustrates the same function as FIG. 6 and FIG. 7. The difference is here that the measurement domain is illustrated as function of the conditional states. Each sub-graph corresponds to one single arrival direction indicated by the printed azimuth and elevation angles. The distribution shows how the sensor output varies when sampled repeatedly based on a true signal emitted in a fixed direction of arrival. Each sub-graph can thus be understood as a distribution that had been observed in a controlled measurement setup with fixed true arrival direction as indicated. The example model spans three dimensions, the scalar angle and the surface component from the arrival-direction. FIG. 8 is printing the sensor output for specified directions and the previous figures are printing the directional dependence assuming a fixed sensor output. Thus, FIG. 8 illustrates the sensor model in fact models the distribution of possible sensor outputs given states. Showing is a sensor-view of the sensor model. Contrary, FIG. 6 and FIG. 7 are tracking views (of the same model) expressing the compatibility between a single output and the complete space of possible directional states. The sensor model f(SIT) of the present disclosure may define all combinations of the continuous variables (S,T) simultaneously. This is not possible to visualise in printed figures. Thus the FIGS. 6-8 represent specific subsets using discrete examples of S (in FIG. 6 and FIG. 7) and discrete examples of T (in FIG. 8).

Figure 9:
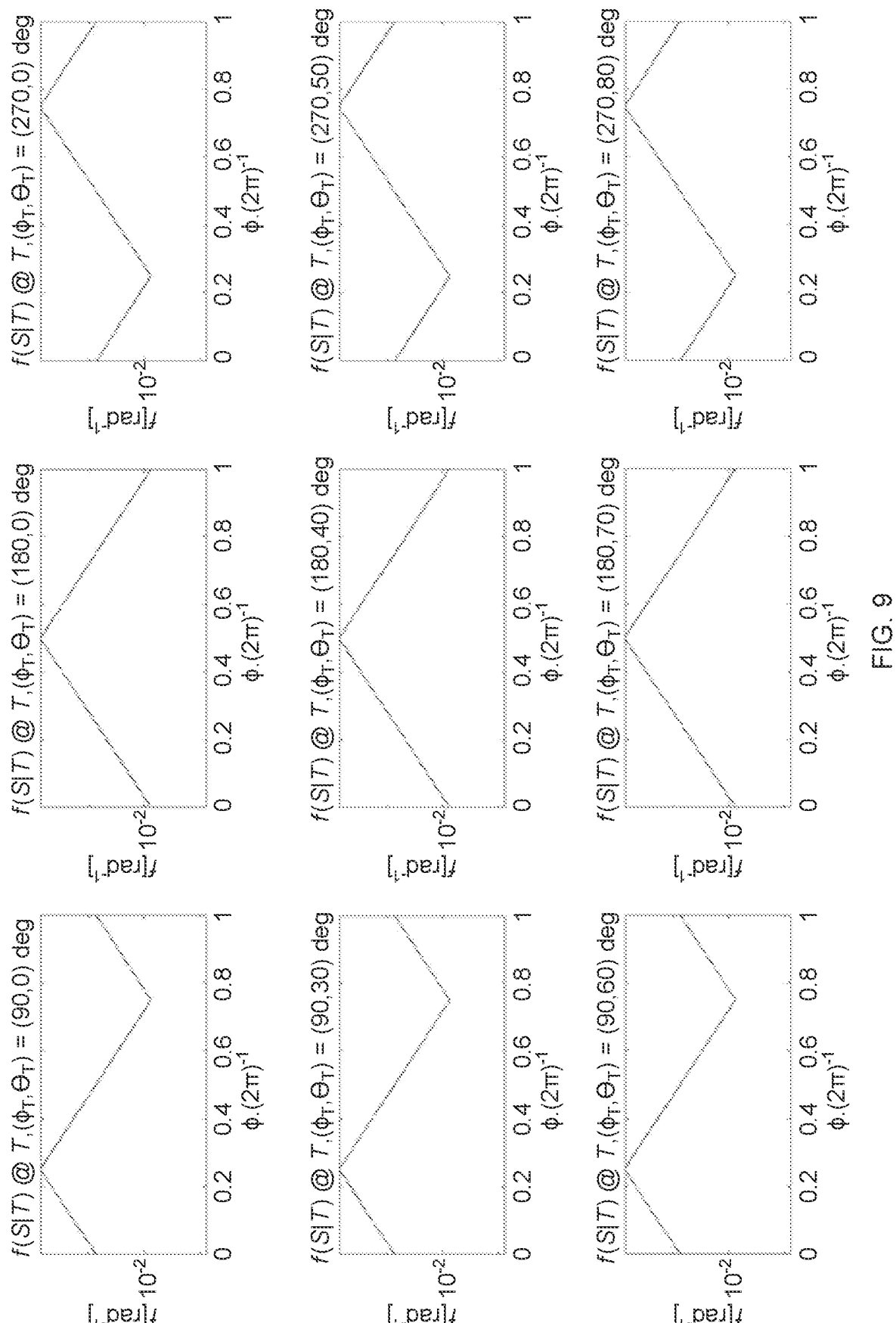
FIG. 9 illustrates an example of an ideal finite element sensor model used as input for a Monte Carlo test of the learning process. The x-axis illustrates the angle or sensor output and the y-axis shows the probability density.
Figure 10A:
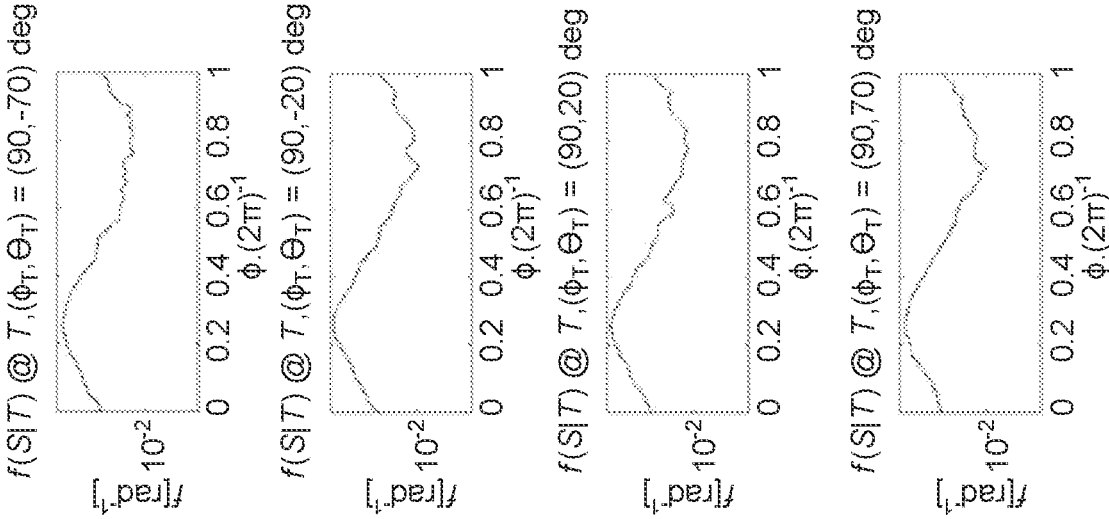
FIGS. 10A-10B illustrate simulation results from a learning process where data to the learning process is generated from the assigned distribution in FIG. 9. The x-axis illustrates the angle or sensor output and the y-axis shows the probability density.
Figure 10A:
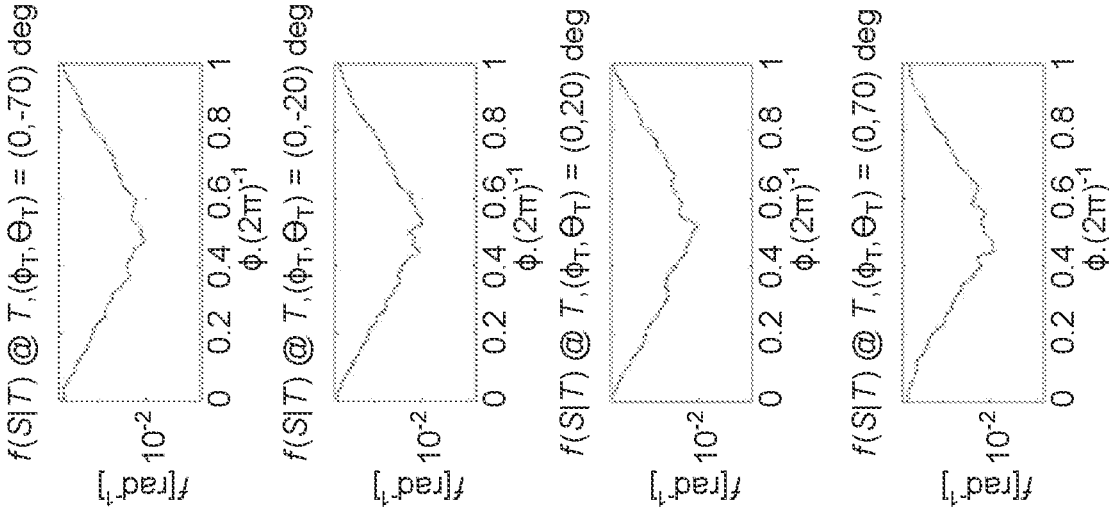
Figure 10B:
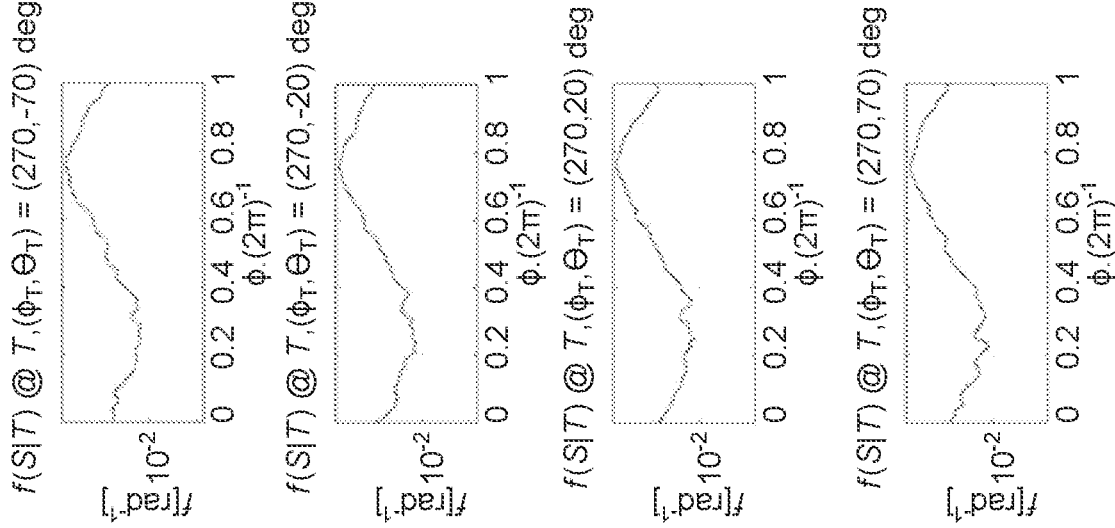
Figure 10B:
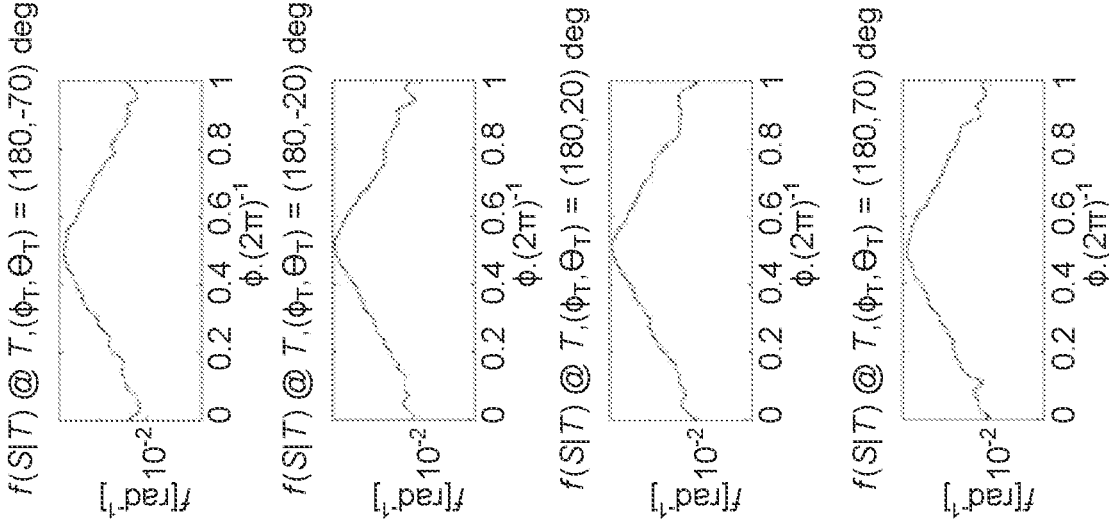

The stochastic error in the learning process is illustrated in FIG. 9 and FIGS. 10A-10B. The effect can be shown in controlled environment, i.e. when training data is generated from a predefined and thus known distribution. FIG. 9 illustrates the sensor view of an assigned and thus known ideal distribution. Learning data (pairs of S,T) are generated from this ideal distribution using Monte Carlo. The sensor view of the resulting trained model is illustrated in FIGS. 10A-10B. It is obvious that the trained model (FIGS. 10A-10B) is not an exact copy of the real one (FIG. 9). The wavy pattern illustrated in each graph in FIGS. 10A-10B is a result of the stochastic sampling in the learning process. It is also shown, in FIGS. 10A-10B, that the variations have largest relative impact in the areas where the density is low. This may result in consequences in tracking schemes as zero probability is a killer of hypothesis in the tracking. The disclosed method 100 provides means for estimation of the errors and it enables adaptation of the mesh/sensor model to control the impact of stochastic estimation errors. Means to mitigate the close to zero problems are thus built in in the disclosed method. The level of estimation noise in the learning process is a function of local sample density to local node density. A high ratio of sample density to node density is required to obtained accurate estimation, especially in low probability areas. In the sharp (i.e. non-simulated) estimations is often the availability of learning data not controllable. Sample density is then not possible to control. There might consequently be a necessity to change the node density locally to keep the learning noise low—this can be provided by the present disclosure. Contrary a high sample density enables adjustment of node density to improve the resolution of the sensor model. Optimal and local selection of node density is enabled by the FEM model in the present disclosure. Efficient usage of learning data is also enabled by the local adaptability of the resolution in the FEM based sensor model in the present disclosure.

The invention claimed is:

1. A method for object tracking applications, the method comprising:
    providing, by a control circuitry of at least one sensor, a finite element model representing a sensor model of the at least one sensor, wherein said finite element model is a numerical model representing a space subdivided into elements where basis functions are associated to each element or each node in a mesh, wherein the space subdivided into elements enable free assignment of element density;
    training, by the control circuitry of the at least one sensor, said finite element model based on observations, wherein each observation comprises an output of the at least one sensor paired with a true state of at least one training object, at a time of the output of the at least one sensor, in an environment sensed by the at least one sensor;
    obtaining, by the control circuitry of the at least one sensor, signals associated with at least one tracked object in an environment sensed by the at least one sensor;
    determining, by the control circuitry of the at least one sensor, additional outputs of the at least one sensor based on the obtained signals;
    determining, by the control circuitry of the at least one sensor, based on the trained finite element model, a probability density for each additional output of the at least one sensor conditional on all possible states of the at least one tracked object at a time of each of the additional outputs of the at least one sensor, in the environment sensed by the at least one sensor; and
    modelling, by the control circuitry of the at least one sensor, the at least one sensor model of the sensor device to acknowledge and compensate error behaviour of the at least one sensor device based on the trained finite element model.

2. The method according to claim 1, wherein the states are at least one of true states and hypothetical states.

3. The method according to claim 1, wherein the probability density for each output is determined given all possible states.

4. The method according to claim 1, wherein the method further comprises the step of:
    representing the probability density in said finite element model of said sensor model for all possible outputs and all possible states.

5. The method according to claim 1, further comprising the step of:
    transmitting the probability density to a remote entity.

6. The method according to claim 1, wherein the states are at least one of direction to an object relative the sensor device, position of an object, velocity of an object, or the position and velocity of an object.

7. The method according to claim 1, wherein the sensor model is stored in a cloud server accessible and trained by a plurality of independent sensor devices.

8. A method for object tracking applications, the method comprising:
    providing, by a control circuitry of at least one sensor, a trained finite element model representing a sensor model of the at least one sensor, wherein said finite element model is a numerical model representing a space subdivided into elements where basis functions are associated to each element or each node in a mesh, wherein the space subdivided into elements enable free assignment of element density, wherein said finite element model is trained based on observations, wherein each observation comprises an output of the at least one sensor paired with a true state of at least one training object, at a time of the output of the at least one sensor, in an environment sensed by the at least one sensor;
    obtaining, by the control circuitry of the at least one sensor, signals associated with at least one tracked object in an environment sensed by the at least one sensor;
    determining, by the control circuitry of the at least one sensor, additional outputs of the at least one sensor based on the obtained signals;
    determining, by the control circuitry of the at least one sensor, based on the trained finite element model, a probability density for each additional output of the at least one sensor conditional on all possible states of the at least one tracked object at a time of each of the additional outputs of the at least one sensor, in the environment sensed by the at least one sensor; and
    modelling, by the control circuitry of the at least one sensor, the at least one sensor model of the sensor device to acknowledge and compensate error behaviour of the at least one sensor device based on the trained finite element model.

9. A sensor device for object tracking applications comprising control circuitry, a memory device, an input interface, at least one output interface, wherein the control circuitry is configured to execute instruction sets stored in the memory device to:
    provide a finite element model representing a sensor model of the sensor device, wherein said finite element model is a numerical model representing a space subdivided into elements where basis functions are associated to each element or each node in a mesh, wherein the space subdivided into elements enable free assignment of element density;
    train said finite element model based on observations, wherein each observation comprises an output of the at least one sensor paired with a true state of at least one training object, at a time of the output of the at least one sensor, in an environment sensed by the at least one sensor;
    obtain signals associated with at least one tracked object in an environment sensed by the at least one sensor;
    determine additional outputs of the at least one sensor based on the obtained signals;
    determine based on the trained finite element model, a probability density for each additional output of the at least one sensor conditional on all possible states of the at least one tracked object at a time of each of the additional outputs of the at least one sensor, in the environment sensed by the at least one sensor; and model the at least one sensor model of the sensor device to acknowledge and compensate error behaviour of the at least one sensor device based on the trained finite element model.

10. A vehicle comprising the sensor device according to claim 9.

11. A sensor device for object tracking applications comprising control circuitry, a memory device, an input interface, at least one output interface, wherein the control circuitry is configured to execute instruction sets stored in the memory device to:

provide a trained finite element model representing a sensor model of the sensor device, wherein said finite element model is a numerical model representing a space subdivided into elements where basis functions are associated to each element or each node in a mesh, wherein the space subdivided into elements enable free assignment of element density, wherein said finite element model is trained based on observations, wherein each observation comprises an output of the at least one sensor paired with a true state of at least one training object, at a time of the output of the at least one sensor, in an environment sensed by the at least one sensor;

obtain signals associated with at least one tracked object in an environment sensed by the at least one sensor;

determine additional outputs of the at least one sensor based on the obtained signals;

determine based on the trained finite element model, a probability density for each additional output of the at least one sensor conditional on all possible states of the at least one tracked object at a time of each of the additional outputs of the at least one sensor, in the environment sensed by the at least one sensor; and model the at least one sensor model of the sensor device to acknowledge and compensate error behaviour of the at least one sensor device based on the trained finite element model.

* * * * *